United States Patent
Fujita et al.

(10) Patent No.: US 10,800,448 B2
(45) Date of Patent: Oct. 13, 2020

(54) STEERING CONTROL APPARATUS

(71) Applicant: JTEKT CORPORATION, Osaka-shi, Osaka (JP)

(72) Inventors: Yuji Fujita, Okazaki (JP); Hiroshi Kawamura, Okazaki (JP); Xavier Joseph Palandre, Nagoya (JP)

(73) Assignee: JTEKT CORPORATION, Osaka (JP)

( * ) Notice: Subject to any disclaimer, the term of this patent is extended or adjusted under 35 U.S.C. 154(b) by 105 days.

(21) Appl. No.: 16/191,947

(22) Filed: Nov. 15, 2018

(65) Prior Publication Data

US 2019/0152517 A1 May 23, 2019

(30) Foreign Application Priority Data

Nov. 22, 2017 (JP) ................. 2017-224993

(51) Int. Cl.
| | |
|---|---|
| *B62D 5/04* | (2006.01) |
| *H02P 6/04* | (2016.01) |
| *B62D 6/10* | (2006.01) |
| *G01L 5/22* | (2006.01) |

(52) U.S. Cl.
CPC ......... *B62D 5/0463* (2013.01); *B62D 5/0403* (2013.01); *B62D 5/046* (2013.01); *B62D 5/0409* (2013.01); *H02P 6/04* (2013.01); *B62D 5/0481* (2013.01); *B62D 6/10* (2013.01); *G01L 5/221* (2013.01)

(58) Field of Classification Search
CPC .... B62D 5/0463; B62D 5/0403; B62D 5/409; B62D 5/046; B62D 5/0481; B62D 6/10; H02P 6/04; G01L 5/221
USPC .......................................................... 701/41
See application file for complete search history.

(56) References Cited

U.S. PATENT DOCUMENTS

| | | | | |
|---|---|---|---|---|
| 2011/0181222 A1* | 7/2011 | Nagase | ..................... | H02P 5/68 318/430 |
| 2015/0298727 A1* | 10/2015 | Kimpara | .................. | G08B 3/10 701/43 |
| 2016/0241182 A1* | 8/2016 | Kuramitsu | .............. | H02P 29/64 |

(Continued)

FOREIGN PATENT DOCUMENTS

JP          2011-195089 A       10/2011

OTHER PUBLICATIONS

May 10, 2019 Extended Search Report issued in European Application No. 18207573.9.

*Primary Examiner* — Yazan A Soofi
(74) *Attorney, Agent, or Firm* — Oliff PLC

(57) ABSTRACT

Provided is a steering control apparatus configured to suppress the occurrence of abnormalities in components in respective systems at the same timing. A first assist torque calculation circuit calculates a first command value and a second command value based on a steering torque. A first current feedback control circuit calculates a control signal by using the first command value. A second current feedback control circuit calculates a control signal by using the second command value. When the steering torque is equal to or smaller than a steering torque threshold, the first assist torque calculation circuit executes calculation so that the first command value is larger than the second command value. After the steering torque exceeds the steering torque threshold, the first assist torque calculation circuit executes calculation so that the first command value is equal to the second command value.

7 Claims, 11 Drawing Sheets

(56) References Cited

U.S. PATENT DOCUMENTS

2016/0241183 A1\* 8/2016 Kuramitsu .............. H02P 25/22
2017/0019052 A1\* 1/2017 Suzuki .................... B62D 5/04
2017/0070178 A1\* 3/2017 Koseki ................... H02P 27/06
2019/0337254 A1\* 11/2019 Brosse ................. B30B 11/085

\* cited by examiner

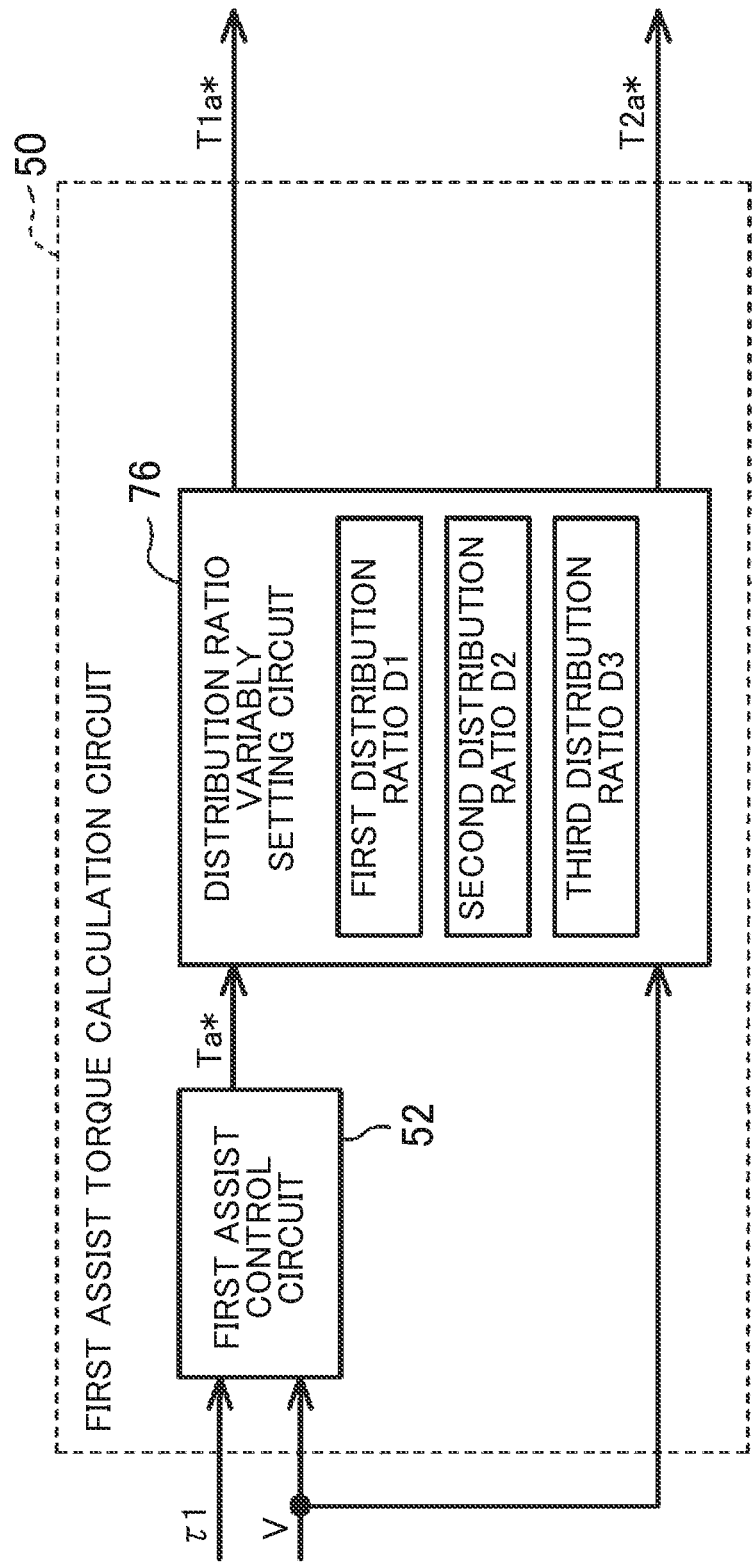

STEERING CONTROL APPARATUS

INCORPORATION BY REFERENCE

The disclosure of Japanese Patent Application No. 2017-224993 filed on Nov. 22, 2017 including the specification, drawings and abstract, is incorporated herein by reference in its entirety.

BACKGROUND OF THE INVENTION

1. Field of the Invention

The present invention relates to a steering control apparatus.

2. Description of the Related Art

Hitherto, there is known a steering system configured to assist a driver's steering operation by applying a driving force of a motor to a steering mechanism of a vehicle. An electronic control unit (ECU) configured to control an operation of the motor is mounted on the steering system. As described in Japanese Patent Application Publication No. 2011-195089 (JP 2011-195089 A), there is an ECU for a steering system having redundancy in the motor, a microcomputer configured to control driving of the motor, and a drive circuit. In this ECU, the microcomputers control the drive circuits, respectively, thereby independently controlling coils of the motor that are provided in a plurality of systems. The microcomputers generate motor control signals to supply electric power to the coils in the respective systems through the control over the drive circuits.

When the microcomputers generate the same motor control signals for the drive circuits in the respective systems to supply electric power to the coils in the respective systems in the same way, control loads are imposed in the same way on the components in the respective systems that are the microcomputers, the drive circuits, and the coils. Then, abnormalities may occur in the components in the respective systems at the same timing due to the same factor even though the redundancy is achieved in the system.

SUMMARY OF THE INVENTION

It is one object of the present invention to provide a steering control apparatus configured to suppress the occurrence of abnormalities in components in respective systems at the same timing.

One aspect of the present invention relates to a steering control apparatus configured to control a steering system configured to apply, by a motor, a driving force for reciprocating a steering operation shaft. The steering control apparatus includes a control circuit configured to cause the motor to apply a torque to a steering mechanism by calculating a command value of the torque based on a steering state variable including a steering torque and controlling power supply to coils of the motor in a plurality of systems based on the command value.

The coils in the plurality of systems include a first-system coil and a second-system coil. The control circuit includes a first-system control circuit and a second-system control circuit. The first-system control circuit is configured to control power supply to the first-system coil based on a first command value that is a command value of a torque to be generated by the first-system coil. The second-system control circuit is configured to control power supply to the second-system coil based on a second command value that is a command value of a torque to be generated by the second-system coil.

The control circuit is configured to execute first control for setting the first command value and the second command value to differ from each other when an input value having a correlation with a total of the torque to be generated by the first-system coil and the torque to be generated by the second-system coil is equal to or smaller than a predetermined value. The control circuit is configured to execute second control for reducing a difference between the first command value and the second command value when the input value is larger than the predetermined value, as compared to a difference between the first command value and the second command value when the input value is equal to or smaller than the predetermined value.

According to this configuration, the first command value and the second command value differ from each other when the input value such as the steering torque or the command value having a correlation with the total of the torques to be generated by the first-system coil and the second-system coil is equal to or smaller than the predetermined value. Therefore, the amount of the power supply to the first-system coil by the first-system control circuit is set different from the amount of the power supply to the second-system coil by the second-system control circuit. Thus, a control load on the first-system control circuit and a control load on the second-system control circuit differ from each other. Since the control load differs between the systems, it is possible to suppress the occurrence of abnormalities in the same components in the respective systems at the same timing.

When the input value is larger than the predetermined value, a difference between the amount of the power supply to the first-system coil by the first-system control circuit and the amount of the power supply to the second-system coil by the second-system control circuit is reduced. Therefore, the control load can further be equalized between the systems. Thus, when the amount of the power supply is large and the control load is heavy as in the case where the input value is larger than the predetermined value, it is possible to suppress concentration of the control load on a part of the systems.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 10A to FIG. 10C are block diagrams illustrating the schematic configurations of a first assist torque calculation circuit according to other embodiments.

DETAILED DESCRIPTION OF EMBODIMENTS

Figure 1:
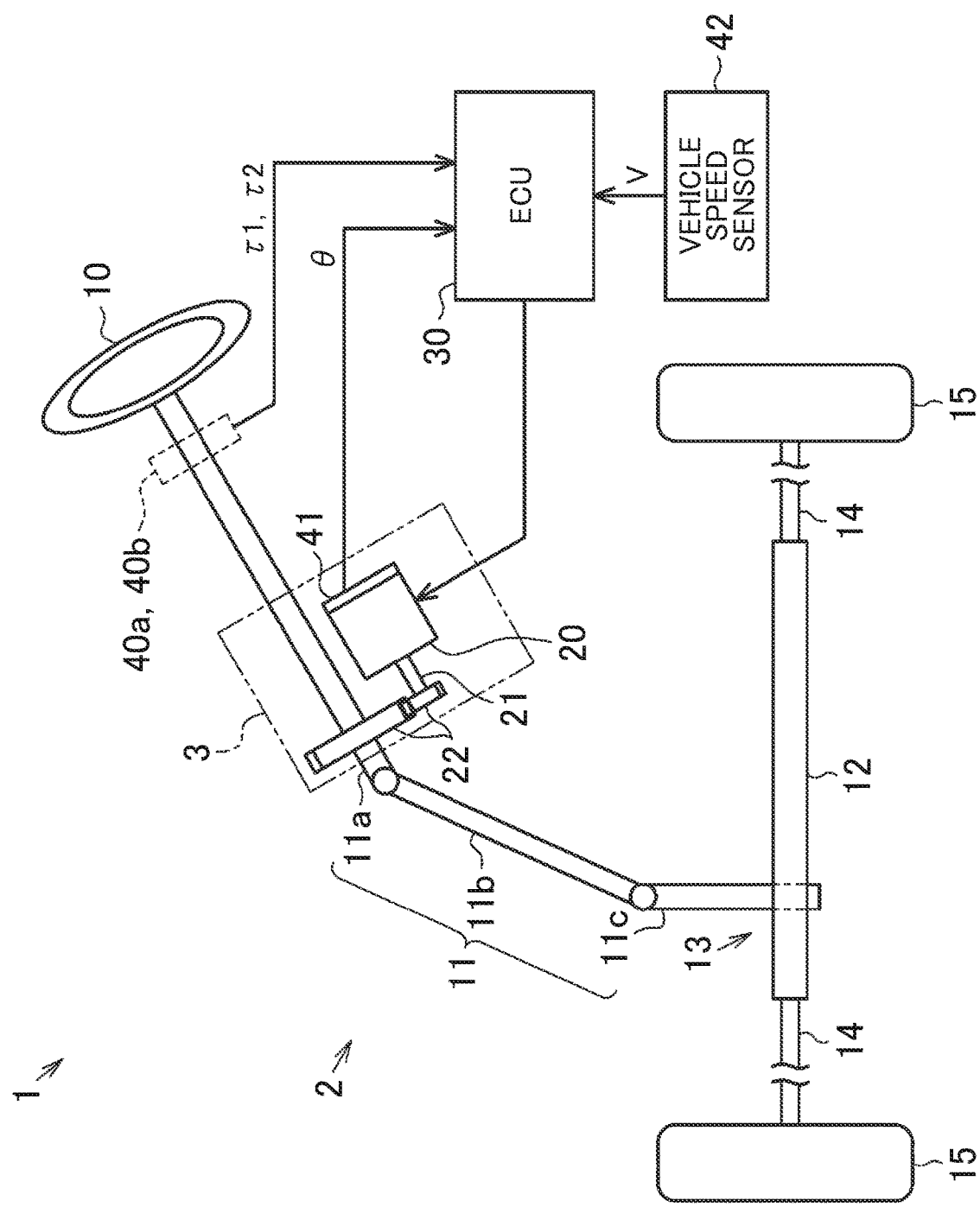
FIG. 1 is a configuration diagram illustrating the schematic configuration of a steering system on which a steering control apparatus is mounted according to one embodiment.

Description is given of an electric power steering system (hereinafter referred to as "EPS") on which a steering control apparatus is mounted according to one embodiment of the present invention. As illustrated in FIG. 1, an EPS 1 includes a steering mechanism 2, an assist mechanism 3, and an electronic control unit (ECU) 30. The steering mechanism 2 turns steered wheels 15 based on a driver's (user's) operation for a steering wheel 10. The assist mechanism 3 assists the driver's steering operation. The ECU 30 serves as the steering control apparatus configured to control the assist mechanism 3.

The steering mechanism 2 includes the steering wheel 10 and a steering shaft 11. The steering wheel 10 is operated by the driver. The steering shaft 11 rotates together with the steering wheel 10. The steering shaft 11 includes a column shaft 11a, an intermediate shaft 11b, and a pinion shaft 11c. The column shaft 11a is coupled to the steering wheel 10. The intermediate shaft 11b is coupled to the lower end of the column shaft 11a. The pinion shaft 11c is coupled to the lower end of the intermediate shaft 11b. The lower end of the pinion shaft 11c is coupled to a rack shaft 12 via a rack and pinion mechanism 13. Rotational motion of the steering shaft 11 is converted to reciprocating linear motion of the rack shaft 12 in its axial direction (lateral direction in FIG. 1) via the rack and pinion mechanism 13. The reciprocating linear motion of the rack shaft 12 is transmitted to the right and left steered wheels 15 via tie rods 14 coupled to respective ends of the rack shaft 12. Thus, steered angles of the steered wheels 15 are changed, and the traveling direction of the vehicle is changed.

The assist mechanism 3 includes a motor 20 and a speed reducing mechanism 22. The motor 20 has a rotation shaft 21. The motor 20 applies a torque to the steering shaft 11. The rotation shaft 21 of the motor 20 is coupled to the column shaft 11a via the speed reducing mechanism 22. The speed reducing mechanism 22 reduces the speed of rotation of the motor 20, and transmits, to the column shaft 11a, a rotational force obtained through the speed reduction. That is, the driver's steering operation is assisted by applying the torque of the motor 20 to the steering shaft 11.

The ECU 30 controls the motor 20 based on detection results from various sensors provided in the vehicle. Examples of various sensors include torque sensors 40a and 40b serving as torque detecting apparatuses, a rotation angle sensor 41, and a vehicle speed sensor 42. The torque sensors 40a and 40b are provided on the column shaft 11a. The rotation angle sensor 41 is provided on the motor 20. The torque sensors 40a and 40b detect steering torques τ1 and τ2 applied to the steering shaft 11 along with the driver's steering operation, respectively. The rotation angle sensor 41 detects a rotation angle θ of the rotation shaft 21 of the motor 20. The vehicle speed sensor 42 detects a vehicle speed V that is a traveling speed of the vehicle. The ECU 30 sets a target torque to be applied to the steering mechanism 2 based on values output from the sensors, and controls a current to be supplied to the motor 20 so that an actual torque of the motor 20 follows the target torque.

Figure 2:
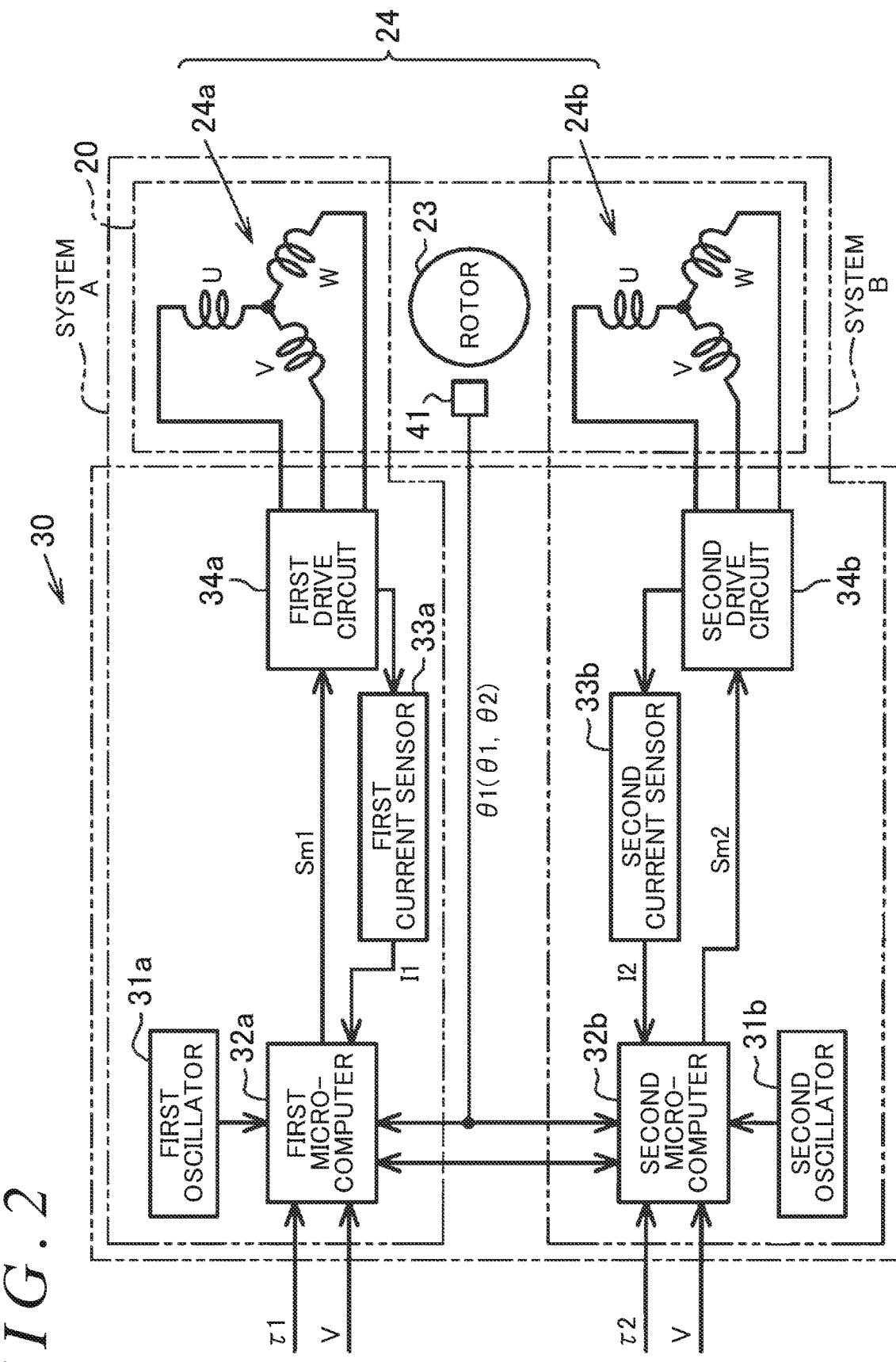
FIG. 2 is a block diagram illustrating the schematic configuration of the steering control apparatus.

Next, the motor 20 is described in detail with reference to FIG. 2. The motor 20 includes a stator (not illustrated) and a rotor 23. The rotor 23 is provided with a plurality of permanent magnets inside. The stator includes a plurality of coils 24 wound around a stator core (not illustrated). The coils 24 include a coil 24a in a system A that is a first system, and a coil 24b in a system B that is a second system. Each of the coils 24a and 24b includes U-phase, V-phase, and W-phase coils that are connected by star connection.

Next, the ECU 30 is described with reference to FIG. 2. The ECU 30 has a part in the system A and a part in the system B. The part in the system A controls electric power to be supplied to the coil 24a. The part in the system B controls electric power to be supplied to the coil 24b.

A first oscillator 31a, a first microcomputer 32a, a first current sensor 33a, and a first drive circuit 34a are provided as the part of the ECU 30 in the system A. A second oscillator 31b, a second microcomputer 32b, a second current sensor 33b, and a second drive circuit 34b are provided as the part of the ECU 30 in the system B. The first oscillator 31a and the second oscillator 31b have the same structure. The first microcomputer 32a and the second microcomputer 32b have the same structure. The first current sensor 33a and the second current sensor 33b have the same structure. The first drive circuit 34a and the second drive circuit 34b have the same structure. Description is given only for one of the components having the same structure, and detailed description of the other is omitted.

The first oscillator 31a generates a clock of a fundamental frequency. Examples of the first oscillator 31a to be employed include a crystal element. Based on the clock generated by the first oscillator 31a, the first microcomputer 32a generates a synchronization signal for adjusting control periods of the first microcomputer 32a and the second microcomputer 32b. In each control period, the first microcomputer 32a generates a control signal Sm1 (pulse width modulation (PWM) signal) based on the steering torque τ1 detected by the torque sensor 40a, the rotation angle θ (first rotation angle θ1) detected by the rotation angle sensor 41, the vehicle speed V detected by the vehicle speed sensor 42, and a current value I1 detected by the first current sensor 33a. The first current sensor 33a detects currents of the respective phases (U phase, V phase, and W phase) that flow along a power supply path between the first drive circuit 34a and the coil 24a.

The first drive circuit 34a is a three-phase (U-phase, V-phase, and W-phase) drive circuit. The first drive circuit 34a turns ON or OFF switching elements that constitute the first drive circuit 34a based on the control signal Sm1 generated by the first microcomputer 32a at a control operation timing, thereby converting direct current (DC) power supplied from a battery (not illustrated) to three-phase alternating current (AC) power. The first drive circuit 34a supplies the three-phase AC power to the coil 24a.

Based on a clock generated by the second oscillator 31b, the second microcomputer 32b generates a synchronization signal for adjusting control operation timings of the first microcomputer 32a and the second microcomputer 32b. At the control operation timing, the second microcomputer 32b generates a control signal Sm2 (PWM signal) based on the steering torque τ2 detected by the torque sensor 40b, the rotation angle θ (second rotation angle θ2) detected by the rotation angle sensor 41, the vehicle speed V detected by the vehicle speed sensor 42, and a current value I2 detected by the second current sensor 33b. The first rotation angle θ1 grasped by the first microcomputer 32a and the second rotation angle θ2 grasped by the second microcomputer 32b are detected by the same rotation angle sensor 41, and therefore have the same value in general. The second current sensor 33b detects currents of the respective phases that flow along a power supply path between the second drive circuit 34b and the coil 24b.

The second drive circuit 34b turns ON or OFF switching elements that constitute the second drive circuit 34b based on the control signal Sm2 generated by the second microcomputer 32b at the control operation timing, thereby converting the DC power supplied from the battery to three-phase AC power. The second drive circuit 34b supplies the three-phase AC power to the coil 24b.

Thus, the first microcomputer 32a and the second microcomputer 32b control the power supply to the coil 24a in the system A and to the coil 24b in the system B through the control over the first drive circuit 34a and the second drive circuit 34b, respectively.

The maximum value of the electric power to be supplied to the coil 24a in the system A is set equal to the maximum value of the electric power to be supplied to the coil 24b in the system B. The maximum value of the electric power to be supplied to each of the coil 24a and the coil 24b is a value corresponding to a half of the maximum torque that can be output from the motor 20.

Figure 3:
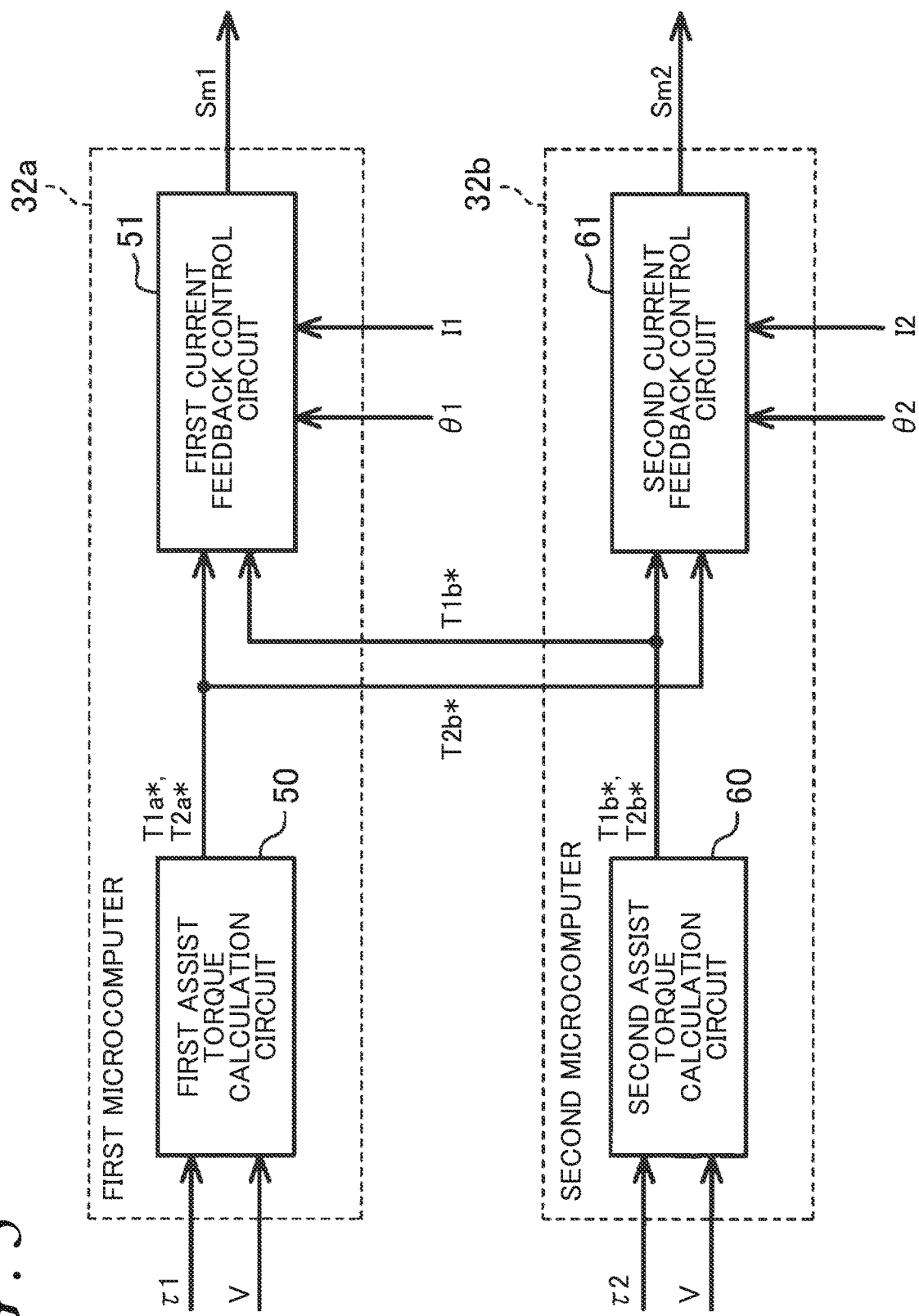
FIG. 3 is a block diagram illustrating the schematic configurations of a first microcomputer and a second microcomputer.

Next, the first microcomputer 32a and the second microcomputer 32b are described in detail with reference to FIG. 3. The first microcomputer 32a includes a first assist torque calculation circuit 50 and a first current feedback control circuit 51. The second microcomputer 32b includes a second assist torque calculation circuit 60 and a second current feedback control circuit 61.

The first assist torque calculation circuit 50 calculates a first command value T1a* and a second command value T2a* based on the steering torque τ1 detected by the torque sensor 40a and the vehicle speed V detected by the vehicle speed sensor 42.

The first command value T1a* is a command value of a torque to be generated by the coil 24a in the system A. The second command value T2a* is a command value of a torque to be generated by the coil 24b in the system B. The first assist torque calculation circuit 50 outputs the first command value T1a* to the first current feedback control circuit 51, and outputs the second command value T2a* to the second current feedback control circuit 61 through communication between the microcomputers.

When the steering torque τ1 is equal to or smaller than a predetermined value, the first command value T1a* and the second command value T2a* to be calculated by the first assist torque calculation circuit 50 are set to different values. When the steering torque τ1 is larger than the predetermined value, the first command value T1a* and the second command value T2a* to be calculated by the first assist torque calculation circuit 50 are set to equal values. That is, when the steering torque τ1 is larger than the predetermined value, a difference between the first command value T1a* and the second command value T2a* is reduced as compared to the case where the steering torque τ1 is the predetermined value.

The second assist torque calculation circuit 60 calculates a first command value T1b* and a second command value T2b* based on the steering torque τ2 detected by the torque sensor 40b and the vehicle speed V detected by the vehicle speed sensor 42. The first command value T1b* is a command value of the torque to be generated by the coil 24a in the system A. The second command value T2b* is a command value of the torque to be generated by the coil 24b in the system B. The second assist torque calculation circuit 60 outputs the first command value T1b* to the first current feedback control circuit 51 through communication between the microcomputers, and outputs the second command value T2b* to the second current feedback control circuit 61.

While the steering torque τ2 is equal to or smaller than the predetermined value, the first command value T1b* and the second command value T2b* to be calculated by the second assist torque calculation circuit 60 are set to different values. After the steering torque τ2 exceeds the predetermined value, the first command value T1b* and the second command value T2b* to be calculated by the second assist torque calculation circuit 60 are set to equal values.

As described above, the setting of the first command values T1a* and T1b* and the second command values T2a* and T2b* to different values, respectively, when the steering torques τ1 and τ2 are equal to or smaller than the predetermined value is referred to as "unbalanced control". The setting of the first command values T1a* and T1b* and the second command values T2a* and T2b* to equal values, respectively, when the steering torques τ1 and τ2 are larger than the predetermined value is referred to as "parallel control".

Specifically, while the steering torques τ1 and τ2 are equal to or smaller than the predetermined value, the first assist torque calculation circuit 50 and the second assist torque calculation circuit 60 execute calculation so that the first command values T1a* and T1b* are larger than the second command values T2a* and T2b*, respectively.

The first current feedback control circuit 51 acquires the first rotation angle θ1 and the current value I1 in addition to the first command value T1a* and the first command value T1b*. The first current feedback control circuit 51 calculates the control signal Sm1 by using one of the first command value T1a* and the first command value T1b*. When the first assist torque calculation circuit 50 is normal, the first current feedback control circuit 51 calculates the control signal Sm1 by using the first command value T1a* calculated by the first assist torque calculation circuit 50. When it is determined that the first assist torque calculation circuit 50 is not normal through fail-safe processing or the like, the first current feedback control circuit 51 calculates the control signal Sm1 by using the first command value T1b* calculated by the second assist torque calculation circuit 60.

When the first assist torque calculation circuit 50 is normal, the second current feedback control circuit 61 calculates the control signal Sm2 by using the second command value T2a* calculated by the first assist torque calculation circuit 50. When it is determined that the first assist torque calculation circuit 50 is not normal through the fail-safe processing or the like, the second current feedback control circuit 61 calculates the control signal Sm2 by using the second command value T2b* calculated by the second assist torque calculation circuit 60. Thus, the first microcomputer 32a operates as a so-called master, and the second microcomputer 32b operates as a so-called slave.

For example, when a difference between the first command value T1a* and the first command value T1b* is smaller than a predetermined value, the first current feedback control circuit 51 may calculate the control signal Sm1 by using the first command value T1a*. When a difference between the second command value T2a* and the second command value T2b* is smaller than the predetermined value, the second current feedback control circuit 61 may calculate the control signal Sm2 by using the second command value T2a*.

The first current feedback control circuit 51 acquires the first rotation angle θ1 and the current value I1 in addition to the first command value T1a* and the first command value T1b*. The first current feedback control circuit 51 calculates the control signal Sm1 by using one of the first command value T1a* and the first command value T1b*. The first current feedback control circuit 51 calculates the control signal Sm1 based on the first command value T1a* (or the first command value T1b*), the first rotation angle θ1, and the current value I1. More specifically, the first current feedback control circuit 51 calculates the control signal Sm1 by executing current feedback control based on a deviation between a current command value corresponding to the first command value T1a* (or the first command value T1b*) and the current value I1 so that the current value I1 follows the current command value.

The second current feedback control circuit 61 acquires the second rotation angle θ2 and the current value I2 in addition to the second command value T2a* and the second command value T2b*. The second current feedback control circuit 61 calculates the control signal Sm2 by using one of the second command value T2a* and the second command value T2b*. The second current feedback control circuit 61 calculates the control signal Sm2 based on the second command value T2a* (or the second command value T2b*), the second rotation angle θ2, and the current value I2. More specifically, the second current feedback control circuit 61 calculates the control signal Sm2 by executing current feedback control based on a deviation between a current command value corresponding to the second command value T2a* (or the second command value T2b*) and the current value I2 so that the current value I2 follows the current command value.

The unbalanced control is executed while the steering torque τ1 is equal to or smaller than the predetermined value (steering torque threshold τ0 described later). Therefore, the unbalanced control is executed, for example, when the vehicle is traveling straightforward. The parallel control is executed when the steering torque τ1 is larger than the predetermined value. Therefore, the parallel control is executed, for example, when the vehicle is operated for parking or when the steering wheel 10 is steered in a stationary manner. Thus, when the vehicle is traveling, the situation in which the unbalanced control is executed occurs more frequently than the situation in which the parallel control is executed.

Next, the first assist torque calculation circuit 50 is described in detail with reference to FIG. 4. The first assist torque calculation circuit 50 includes a first assist control circuit 52, an equal distribution circuit 53, a torque shift ratio calculation circuit 54, a multiplier 55, and adders 56 and 57. The second assist torque calculation circuit 60 includes components similar to those of the first assist torque calculation circuit 50.

The first assist control circuit 52 calculates a basic command value Ta* that is the total of the first command value T1a* and the second command value T2a* based on the steering torque τ1 detected by the torque sensor 40a and the vehicle speed V detected by the vehicle speed sensor 42.

Figure 5:
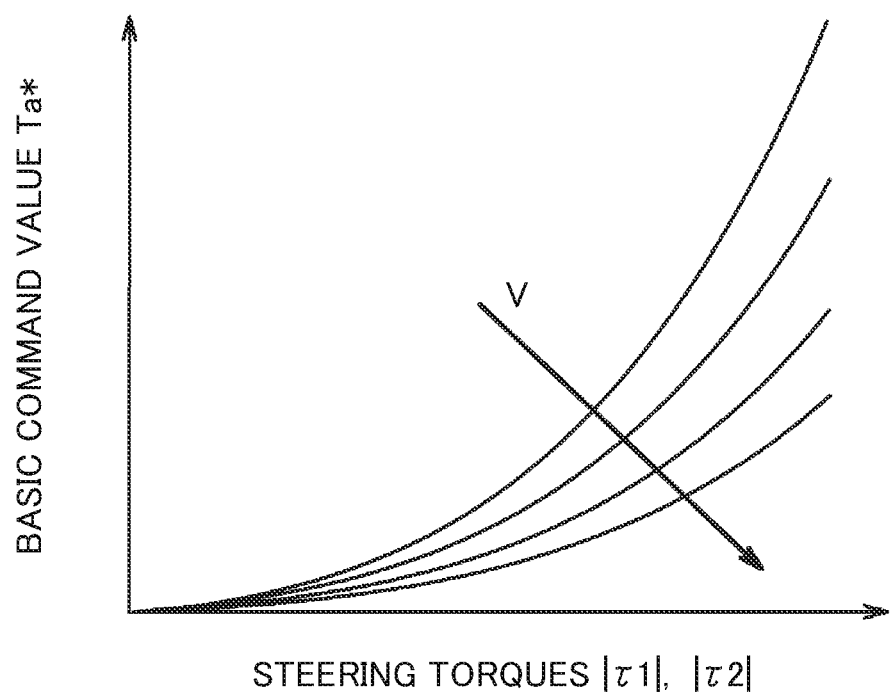
FIG. 5 is a graph illustrating a relationship between a first assist control amount and a first steering torque.

Specifically, as illustrated in FIG. 5, the first assist control circuit 52 calculates a basic command value Ta* having a larger absolute value as the absolute value of the input steering torque τ1 increases and as the vehicle speed V decreases. A ratio (|ΔTa*/Δτ1|) of a change amount |ΔTa*| of the absolute amount of the basic command value Ta* to a change amount |Δτ1| of the absolute value of the steering torque τ1 increases as the absolute value of the steering torque τ1 increases. The positive or negative sign of the steering torque τ1 is determined based on whether the steering wheel 10 is steered rightward or leftward. The basic command value Ta* calculated by the first assist control circuit 52 also has a positive or negative sign in association with the positive or negative sign of the steering torque τ1.

The equal distribution circuit 53 multiplies the input basic command value Ta* by "½". That is, the equal distribution circuit 53 calculates an equalized command value Tae* obtained by equally distributing the basic command value Ta* (that is, Ta*/2).

The torque shift ratio calculation circuit 54 calculates a torque shift ratio Rts based on the input basic command value Ta*. The torque shift ratio Rts serving as a distribution ratio is a ratio between the command value of the torque to be generated by the coil 24a in the system A and the command value of the torque to be generated by the coil 24b in the system B. In other words, the torque shift ratio Rts is a value indicating how much deviation (increase or decrease) is permissible between the equalized command value Tae* and each of the torque to be generated by the coil 24a in the system A and the torque to be generated by the coil 24b in the system B. By increasing or decreasing the torque shift ratio Rts, a control load between the system A and the system B is changed. The torque shift ratio calculation circuit 54 and the equal distribution circuit 53 constitute a distribution ratio setting circuit configured to distribute the basic command value Ta* to the first command value T1a* and the second command value T2a*.

The multiplier 55 calculates a shifted torque command value Tas* by multiplying "Ta*/2" by the torque shift ratio Rts. The value "Ta*/2" is a value that is calculated by the equal distribution circuit 53 and corresponds to a half of the basic command value Ta*.

The adder 56 calculates the first command value T1a* by subtracting the shifted torque command value Tas* calculated by the multiplier 55 from the equalized command value Tae* calculated by the equal distribution circuit 53.

The adder 57 calculates the second command value T2a* by subtracting the first command value T1a* calculated by the adder 56 from the basic command value Ta* calculated by the first assist control circuit 52.

When the input basic command value Ta* is equal to or smaller than a command threshold, the torque shift ratio calculation circuit 54 sets the torque shift ratio Rts to a value larger than zero so that the first command value T1a* and the second command value T2a* differ from each other. That is, when the torque shift ratio Rts is larger than zero, the shifted torque command value Tas* calculated by the multiplier 55 is a value larger than zero. Therefore, the first command value T1a* is smaller than the equalized command value Tae* ("Ta*/2" that is the value corresponding to the half of the basic command value Ta*) by the shifted torque command value Tas*. The second command value T2a* is a value obtained by subtracting the first command value T1a* from the basic command value Ta*, and is therefore larger than the equalized command value Tae* by the shifted torque command value Tas*. Thus, the first command value T1a* can be set smaller than the second command value T2a*. Accordingly, it is possible to achieve the unbalanced control in which the load on the components in the system A is set different from the load on the components in the system B.

The basic command value Ta* is an input value having a correlation with the torque to be generated by the motor 20. The command threshold is a threshold for determining which of the unbalanced control and the parallel control to execute based on a result of comparison between the command threshold and the input value. That is, when the basic command value Ta* is equal to or smaller than the command threshold, the unbalanced control is executed. When the basic command value Ta* is larger than the command threshold, the parallel control is executed.

When the input basic command value Ta* is larger than the command threshold, the torque shift ratio calculation circuit 54 sets the torque shift ratio Rts to zero so that the first command value T1a* and the second command value T2a* are equal to each other. When the torque shift ratio Rts is zero, the shifted torque command value Tas* calculated by the multiplier 55 is zero. Therefore, the first command value T1a* corresponds to the equalized command value Tae* that is the value corresponding to the half of the basic command value Ta*. The second command value T2a* is a value obtained by subtracting the first command value T1a* from the basic command value Ta*, and therefore corresponds to the equalized command value Tae*. Thus, the first command value T1a* can be set equal to the second command value T2a*. Accordingly, it is possible to achieve the parallel control in which the load on the components in the system A is set equal to the load on the components in the system B.

Figure 6:
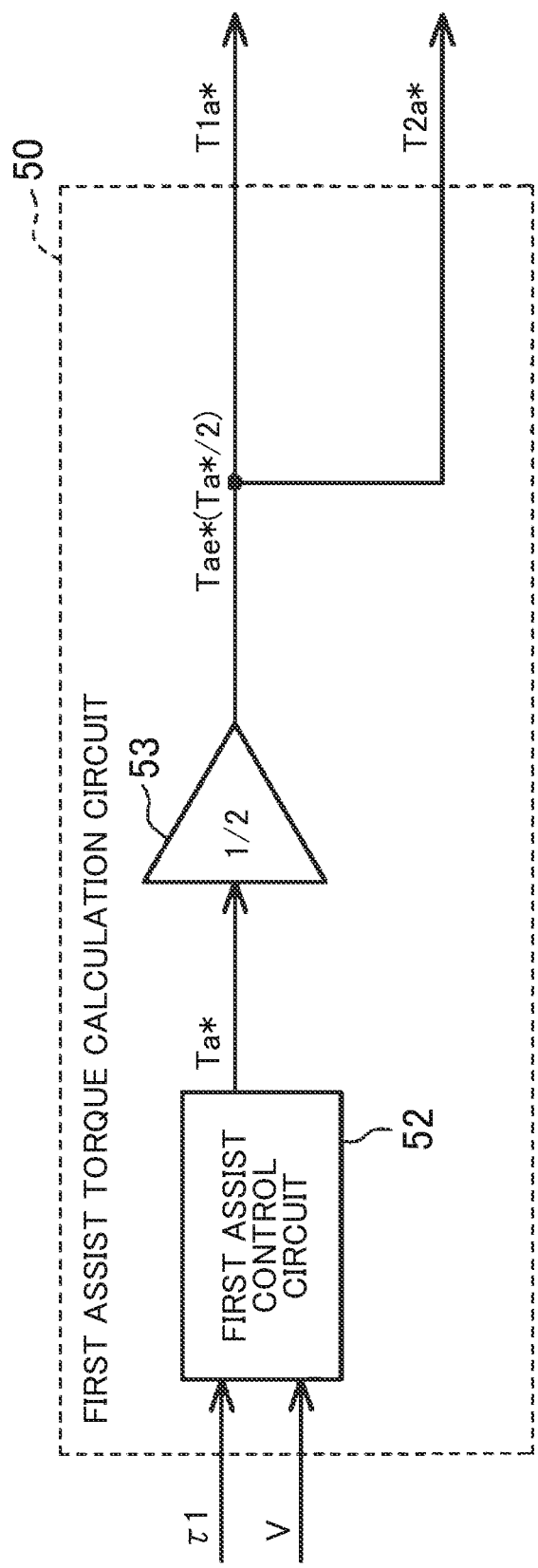
FIG. 6 is a block diagram illustrating the schematic configuration of the first assist torque calculation circuit during parallel control.

As illustrated in FIG. 6, during the execution of the parallel control, the equalized command value Tae* calculated by the equal distribution circuit 53 may be set directly as each of the first command value T1a* and the second command value T2a*.

Next, description is given of relationships of the first command values T1a* and T1b* and the second command values T2a* and T2b* with the steering torques τ1 and τ2. For convenience of the description, the vehicle speed V is assumed to be constant. The first command value T1b* and the second command value T2b* are calculated by the second assist torque calculation circuit 60, but are the same as the first command value T1a* and the second command value T2a* calculated by the first assist torque calculation circuit 50.

Figure 7A:
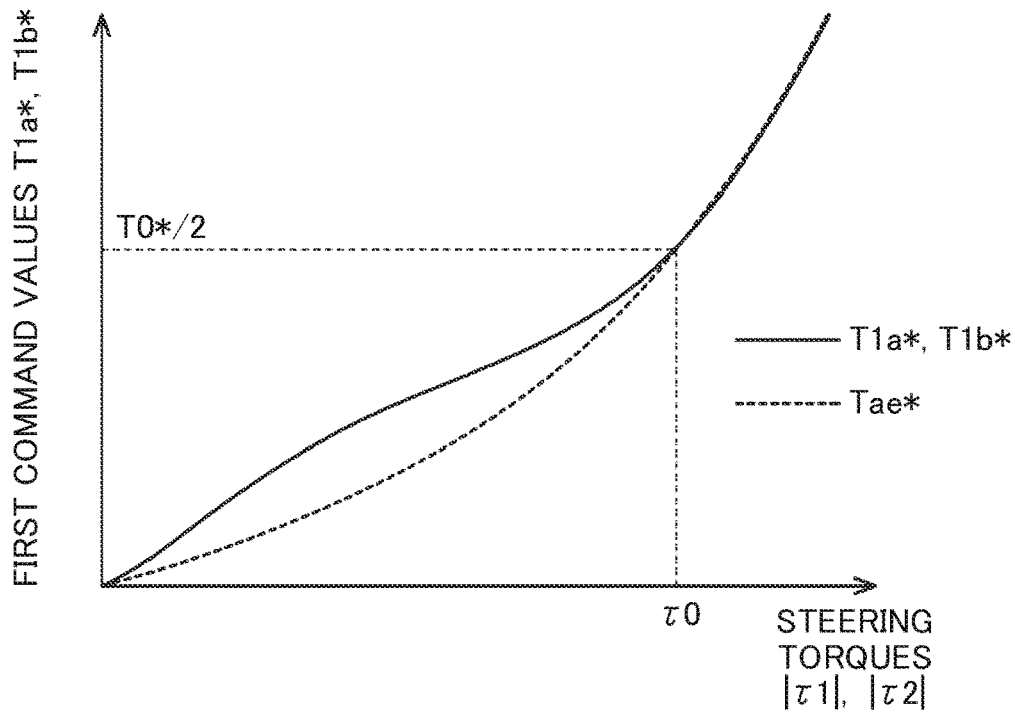
FIG. 7A is a graph illustrating a relationship between an assist amount generated by a coil of a motor in a system A and a steering torque.

As indicated by a dashed line in FIG. 7A, the equalized command value Tae* increases as the absolute values of the steering torques τ1 and τ2 increase. Under the condition that the vehicle speed V is the same, the relationship of the equalized command value Tae* with the absolute values of the steering torques τ1 and τ2 corresponds to the relationship of the basic command value Ta* with the absolute values of the steering torques τ1 and τ2, which is represented by a curve illustrated in FIG. 5, provided that the slope of the curve is halved. Therefore, the slope of the curve of the equalized command value Tae* relative to the steering torques τ1 and τ2 is steeper as the absolute values of the steering torques τ1 and τ2 increase.

As indicated by a continuous line in FIG. 7A, the first command values T1a* and T1b* calculated by the first assist torque calculation circuit 50 and the second assist torque calculation circuit 60 increase as the absolute values of the steering torques τ1 and τ2 increase similarly to the equalized command value Tae*. When the absolute values of the steering torques τ1 and τ2 are equal to or smaller than the steering torque threshold τ0, in other words, when the first command values T1a* and T1b* are equal to or smaller than a value corresponding to a half of a command threshold τ0*, the first command values T1a* and T1b* are set larger than the equalized command value Tae*. That is, when the basic command value Ta* is equal to or smaller than the command threshold τ0*, the first command values T1a* and T1b* are set larger than the equalized command value Tae*. When the steering torques τ1 and τ2 are equal to or smaller than the steering torque threshold τ0, the slope of the curve of the first command values T1a* and T1b* relative to the steering torques τ1 and τ2 is set steeper in a case where the steering torques τ1 and τ2 are close to zero than a case where the steering torques τ1 and τ2 are close to the steering torque threshold τ0.

When the absolute values of the steering torques τ1 and τ2 are larger than the steering torque threshold TO, in other words, when the first command values T1a* and T1b* are larger than the value corresponding to the half of the command threshold τ0*, the first command values T1a* and T1b* are set equal to the equalized command value Tae*.

That is, when the basic command value Ta* is larger than the command threshold τ0*, the first command values T1a* and T1b* are set equal to the equalized command value Tae*. When a transition is made from the range in which the absolute values of the steering torques τ1 and τ2 are equal to or smaller than the steering torque threshold τ0 to the range in which the absolute values of the steering torques τ1 and τ2 are larger than the steering torque threshold τ0, the first command values T1a* and T1b* make a continuous transition from the state in which the first command values T1a* and T1b* are larger than the equalized command value Tae* to the state in which the first command values T1a* and T1b* are equal to the equalized command value Tae*.

Figure 7B:
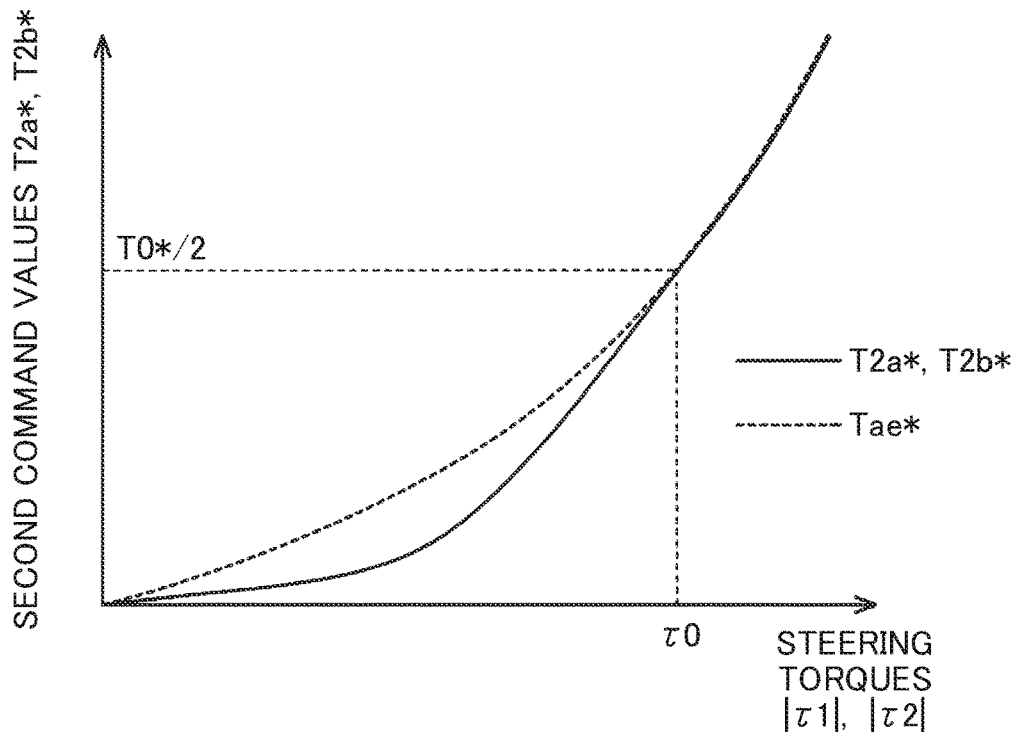
FIG. 7B is a graph illustrating a relationship between an assist amount generated by a coil of the motor in a system B and the steering torque.

The second command values T2a* and T2b* indicated by a continuous line in FIG. 7B increase as the absolute values of the steering torques τ1 and τ2 increase similarly to the equalized command value Tae* indicated by a dashed line. When the absolute values of the steering torques τ1 and τ2 are equal to or smaller than the steering torque threshold τ0, the second command values T2a* and T2b* are set smaller than the equalized command value Tae*. When the steering torques τ1 and τ2 are equal to or smaller than the steering torque threshold τ0, the slope of the curve of the second command values T2a* and T2b* relative to the steering torques τ1 and τ2 is set flatter in the case where the steering torques τ1 and τ2 are close to zero than the case where the steering torques τ1 and τ2 are close to the steering torque threshold τ0. When the absolute values of the steering torques τ1 and τ2 are larger than the steering torque threshold τ0, the second command values T2a* and T2b* are set equal to the equalized command value Tae*. When a transition is made from the range in which the absolute values of the steering torques τ1 and τ2 are equal to or smaller than the steering torque threshold τ0 to the range in which the absolute values of the steering torques τ1 and τ2 are larger than the steering torque threshold τ0, the second command values T2a* and T2b* make a continuous transition from the state in which the second command values T2a* and T2b* are smaller than the equalized command value Tae* to the state in which the second command values T2a* and T2b* are equal to the equalized command value Tae*.

The torque shift ratio calculation circuit 54 variably sets the torque shift ratio Rts based on the basic command value Ta* so that the first command values T1a* and T1b* and the second command values T2a* and T2b* are set as illustrated in FIG. 7A and FIG. 7B, respectively. The torque shift ratio calculation circuit 54 may variably set the torque shift ratio Rts based on the steering torques τ1 and τ2.

Figure 8:
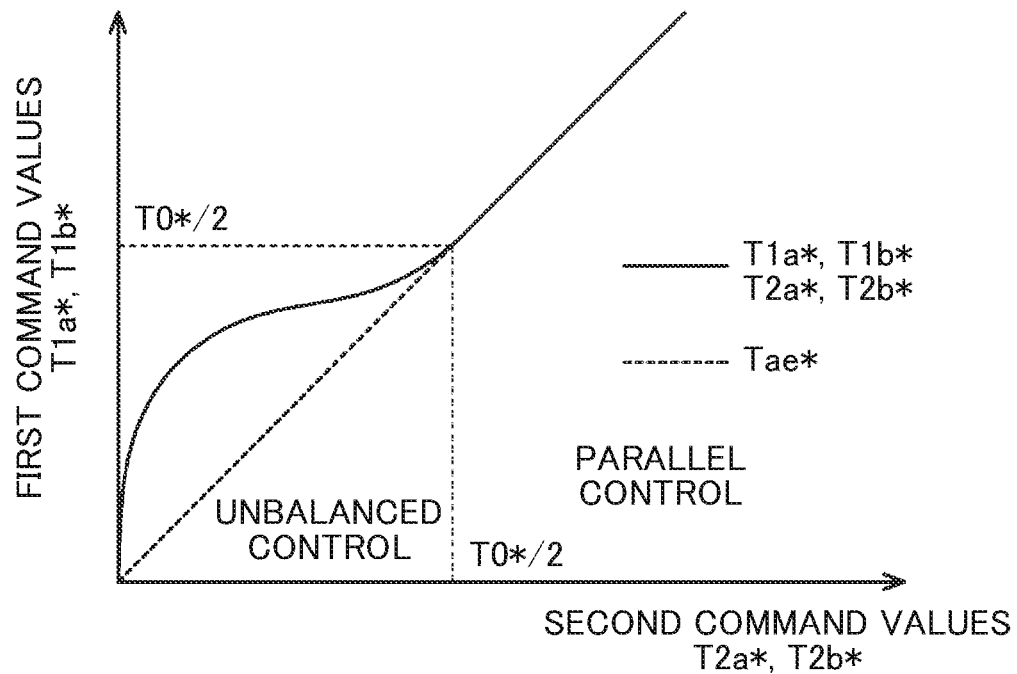
FIG. 8 is a graph illustrating a relationship between the assist amount in the system A and the assist amount in the system B.

In FIG. 8, the second command values T2a* and T2b* are plotted along the horizontal axis, and the first command values T1$a$* and T1$b$* are plotted along the vertical axis. In FIG. 8, a dashed line indicates a relationship in a case where the first command values T1$a$* and T1$b$* and the second command values T2$a$* and T2$b$* are equal to the equalized command value Tae*. In FIG. 8, a continuous line indicates a relationship between the first command values T1$a$* and T1$b$* having the relationship of FIG. 7A and the second command values T2$a$* and T2$b$* having the relationship of FIG. 7B. When the basic command value Ta* is equal to or smaller than the command threshold τ0*, in other words, when the first command values T1$a$* and T1$b$* are equal to or smaller than the value corresponding to the half of the command threshold τ0*, the unbalanced control is executed. Therefore, the first command values T1$a$* and T1$b$* and the second command values T2$a$* and T2$b$* indicated by the continuous line deviate from the equalized command value Tae* indicated by the dashed line. When the basic command value Ta* is larger than the command threshold τ0*, in other words, when the first command values T1$a$* and T1$b$* (second command values T2$a$* and T2$b$* ) are larger than the value corresponding to the half of the command threshold τ0*, the parallel control is executed. Therefore, the first command values T1$a$* and T1$b$* and the second command values T2$a$* and T2$b$* indicated by the continuous line coincide with the equalized command value Tae* indicated by the dashed line. That is, during the execution of the unbalanced control, the first command values T1$a$* and T1$b$* are set larger than the second command values T2$a$* and T2$b$*.

Next, description is given of a procedure of executing the fail-safe processing by the ECU 30 during the execution of the unbalanced control. For example, the fail-safe processing is executed in each of the first microcomputer 32$a$ and the second microcomputer 32$b$ of the ECU 30.

Figure 9:
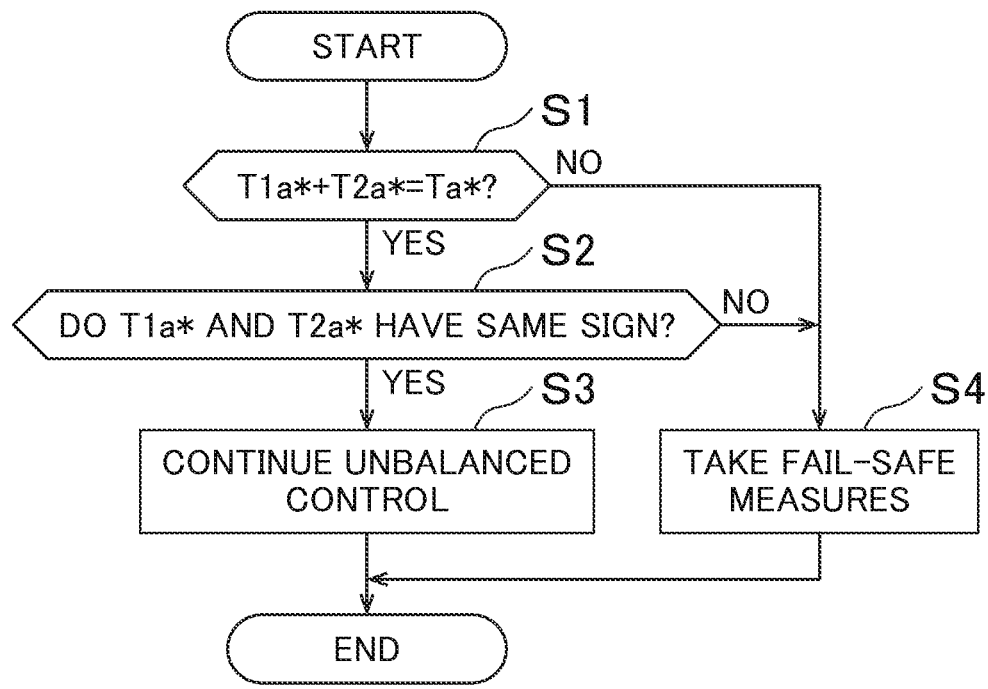
FIG. 9 is a flowchart illustrating a processing procedure of fail-safe processing during unbalanced control.

As illustrated in a flowchart of FIG. 9, the ECU 30 determines whether the sum of the first command value T1$a$* and the second command value T2$a$* is equal to the basic command value Ta* (Step S1). When the calculation is executed properly by the first microcomputer 32$a$, the sum of the first command value T1$a$* and the second command value T2$a$* is supposed to be equal to the basic command value Ta*.

When the sum of the first command value T1$a$* and the second command value T2$a$* is equal to the basic command value Ta* (YES in Step S1), the ECU 30 determines whether the first command value T1$a$* and the second command value T2$a$* have the same sign (Step S2). When the calculation is executed properly by the first microcomputer 32$a$, the first command value T1$a$* and the second command value T2$a$* are supposed to have the same sign. This is because the torque generated by the coil 24$a$ in the system A is not caused to cancel out the torque generated by the coil 24$b$ in the system B when the motor 20 is rotated in a predetermined direction.

When the first command value T1$a$* and the second command value T2$a$* have the same sign (YES in Step S2), the ECU 30 continues the unbalanced control (Step S3). When the sum of the first command value T1$a$* and the second command value T2$a$* is not equal to the basic command value Ta* (NO in Step S1), the ECU 30 stops the unbalanced control, and takes fail-safe measures (Step S4). Examples of the fail-safe measures include stopping of calculation executed in one of the system A and the system B in which an abnormality may occur, and execution of feedback control by the first current feedback control circuit 51 and the second current feedback control circuit 61 using the command values calculated by the second assist torque calculation circuit 60.

When the first command value T1$a$* and the second command value T2$a$* do not have the same sign (NO in Step S2), the ECU 30 stops the unbalanced control, and takes the fail-safe measures (Step S4). Then, the fail-safe processing is terminated. The fail-safe processing is executed repeatedly at predetermined time intervals.

Actions and effects of this embodiment are described. In this embodiment, for convenience of the description, it is assumed that the control signals Sm1 and Sm2 are calculated by using the first command value T1$a$* and the second command value T2$a$*.

(1) When the absolute value of the steering torque τ1 equal to or smaller than the steering torque threshold τ0 is generated through the driver's steering operation, the unbalanced control is executed. Thus, the amount of the supply of electric power to the motor 20 from the system B of the ECU 30 is smaller than that of the supply of electric power to the motor 20 from the system A of the ECU 30. In other words, when the absolute value of the steering torque τ1 is equal to or smaller than the steering torque threshold τ0, a larger torque is generated in the system A than the system B. Therefore, when the absolute value of the steering torque τ1 is equal to or smaller than the steering torque threshold τ0, the torque can be generated by the motor 20 in a state in which the control load imposed on the components in the system B (such as the coil 24$b$, the second microcomputer 32$b$, and the second drive circuit 34$b$) is not as heavy as the control load imposed on the components in the system A (such as the coil 24$a$, the first microcomputer 32$a$, and the first drive circuit 34$a$).

When the steering torque τ1 larger than the steering torque threshold τ0 is generated through the driver's steering operation, the parallel control is executed. Thus, the same amount of electric power is supplied to the motor 20 from the system A of the ECU 30 and the system B of the ECU 30.

As a comparative example, when the system A and the system B are used with the same control load, abnormalities may occur in the same components in the respective systems at the same timing due to the same factor. For example, when the coil 24$a$ and the coil 24$b$ are used with the same control load, both the coils may deteriorate over time in the same way, and may therefore fail at the same timing. When the first drive circuit 34$a$ and the second drive circuit 34$b$ are used with the same control load, both the drive circuits may deteriorate over time in the same way, and may therefore fail at the same timing. The same components in the respective systems may also fail at the same timing due to a factor other than the deterioration over time, such as a faulty operation caused by heat generation or the like.

In this embodiment, the control load differs between the system A and the system B (specifically, the control load on the system B is lighter than the control load on the system A). Therefore, it is possible to suppress the occurrence of abnormalities in the same components in the respective systems at the same timing. That is, the imbalance between the control loads on the respective systems suppresses the occurrence of abnormalities in the same components in the respective systems at the same timing, thereby suppressing loss of the assist by the torque of the motor 20 in the EPS 1. This is because, for example, the system B having a lighter control load may remain without failure even if the system A having a heavier control load fails. In this case, the system B that remains without failure can generate the torque of the motor 20 (for example, a torque up to a half of the maximum torque of the motor 20). Thus, the assist can be continued based on this torque.

(2) The unbalanced control is executed in the situation in which the absolute values of the steering torques $\tau 1$ and $\tau 2$ are equal to or smaller than the steering torque threshold $\tau 0$. Specifically, the unbalanced control is mostly executed when the vehicle is traveling straightforward. When the unbalanced control is executed, the control load on the system A is heavier than that on the system B, and therefore the amount of heat generation in the system A may be larger than that in the system B. For example, when the vehicle is traveling straightforward, the steering operation is not executed frequently. Even if the steering operation is executed temporarily to make a right or left turn, heat may be dissipated when the vehicle then travels straightforward. Further, the steering torques $\tau 1$ and $\tau 2$ are equal to or smaller than the steering torque threshold $\tau$, and therefore the amount of heat generation itself may be small. Thus, even during the execution of the unbalanced control, there is almost no need to increase the performance in terms of heat, such as heat dissipation performance, in the system A as compared to the system B.

The parallel control is executed in the situation in which the absolute values of the steering torques $\tau 1$ and $\tau 2$ are larger than the steering torque threshold $\tau 0$. Specifically, the parallel control is executed when the vehicle is operated for parking or when the vehicle is steered in a stationary manner. When the steering operation is executed along with parking or the like, the control load may increase temporarily, and the steering operation may be executed continuously. In this embodiment, during the execution of the parallel control, the control loads on the system A and the system B are set equal to each other. Thus, there is almost no need to increase the performance in terms of heat in one of the system A and the system B.

As described above, when the unbalanced control is executed, the control load differs between the system A and the system B, but there is no need to excessively increase the performance in terms of heat in one of the system A and the system B that has a heavier control load.

(3) The torque shift ratio calculation circuit 54 variably sets the torque shift ratio Rts based on the basic command value Ta*. In other words, the basic command value Ta* is calculated based on each of the steering torques $\tau 1$ and $\tau 2$, and therefore the torque shift ratio calculation circuit 54 variably sets the torque shift ratio Rts based on each of the steering torques $\tau 1$ and $\tau 2$. Therefore, when a transition is made from the range in which the absolute values of the steering torques $\tau 1$ and $\tau 2$ are equal to or smaller than the steering torque threshold $\tau 0$ to the range in which the absolute values of the steering torques $\tau 1$ and $\tau 2$ are larger than the steering torque threshold $\tau 0$, the first command values T1a* and T1b* can make a smooth transition from the state in which the first command values T1a* and T1b* are larger than the equalized command value Tae* to the state in which the first command values T1a* and T1b* are equal to the equalized command value Tae*. Thus, a smooth transition can be made from the unbalanced control to the parallel control, whereby a better steering feel can be attained.

As a comparative example, it is assumed that, when a transition is made from the range in which the absolute values of the steering torques $\tau 1$ and $\tau 2$ are equal to or smaller than the steering torque threshold $\tau 0$ to the range in which the absolute values of the steering torques $\tau 1$ and $\tau 2$ are larger than the steering torque threshold $\tau 0$, the first command values T1a* and T1b* make a non-continuous transition from the state in which the first command values T1a* and T1b* are larger than the equalized command value Tae* to the state in which the first command values T1a* and T1b* are equal to the equalized command value Tae*. In this case, the first command values T1a* and T1b* may significantly change between the case where the absolute values of the steering torques $\tau 1$ and $\tau 2$ are equal to the steering torque threshold $\tau 0$ and the case where the absolute values of the steering torques $\tau 1$ and $\tau 2$ are slightly larger than the steering torque threshold $\tau 0$. Therefore, a smooth transition cannot be made from the unbalanced control to the parallel control. This is because the currents flowing through the coils 24a and 24b are ideally changed in response to the significant change in the first command values T1a* and T1b* but the change in the currents may fail to follow the change in the first command values T1a* and T1b* in reality. As a result, the driver may perceive an abrupt change in the steering feel.

(4) During the unbalanced control, the fail-safe processing is executed as illustrated in the flowchart of FIG. 9. Even during the unbalanced control, the following conditions need to be satisfied constantly: the sum of the first command value T1a* and the second command value T2a* is equal to the basic command value Ta*, and the first command value T1a* and the second command value T2a* have the same sign. When the conditions for the fail-safe processing are satisfied nevertheless, it is preferable that the unbalanced control be stopped and the fail-safe measures be taken instead of continuing the unbalanced control. For example, when it is supposed that the calculation is not executed properly by the first assist torque calculation circuit 50, an assist amount that is at least a half of the assist amount to be originally obtained can be maintained by stopping the unbalanced control and taking the fail-safe measures. If the unbalanced control is continued despite the supposition that the calculation is not executed properly by the first assist torque calculation circuit 50, an excessive load may be imposed on the system A.

It is also supposed that the sum of the first command value T1a* and the second command value T2a* is equal to the basic command value Ta* but the first command value T1a* and the second command value T2a* are distributed differently from the values to be originally calculated due to a calculation error or the like. Even in this case, the torque generated by the motor 20 is equal to the torque to be originally calculated. Thus, the assist can be continued based on this torque.

This embodiment may be modified as follows. The following other embodiments may be combined without causing any technical contradiction. In this embodiment, the redundancy is achieved by two systems that are the system A and the system B, but may be achieved by three or more systems. For example, when the redundancy is achieved by three systems, the coil in each system generates a torque that is ⅓ of the maximum torque of the motor 20. When the unbalanced control is executed, the control load on one of the three systems is set lighter than the control loads on the other two systems, thereby suppressing failure in the one system having a lighter control load at the same timing as those of the other two systems. When the parallel control is executed, the control loads on the three systems are set equal to each other, thereby suppressing concentration of the control load on a part of the systems.

When the difference between the first command value T1a* and the first command value T1b* is smaller than the predetermined value, the first current feedback control circuit 51 may calculate the control signal Sm1 by using the mean value of the first command value T1$a$* and the first command value T1$b$*. The same applies to the second current feedback control circuit 61.

The rotation angle sensor 41 may be a magnetoresistive (MR) sensor, a Hall sensor, or a resolver. In this embodiment, each of the system A and the system B generates the torque (assist amount) that is the half (50%) of the maximum torque of the motor 20, but the present invention is not limited to this case. That is, the maximum torque that can be generated in the system A may differ from the maximum torque that can be generated in the system B. The sum of the maximum torque that can be generated in the system A and the maximum torque that can be generated in the system B is set equal to or smaller than 100%.

Figure 4:
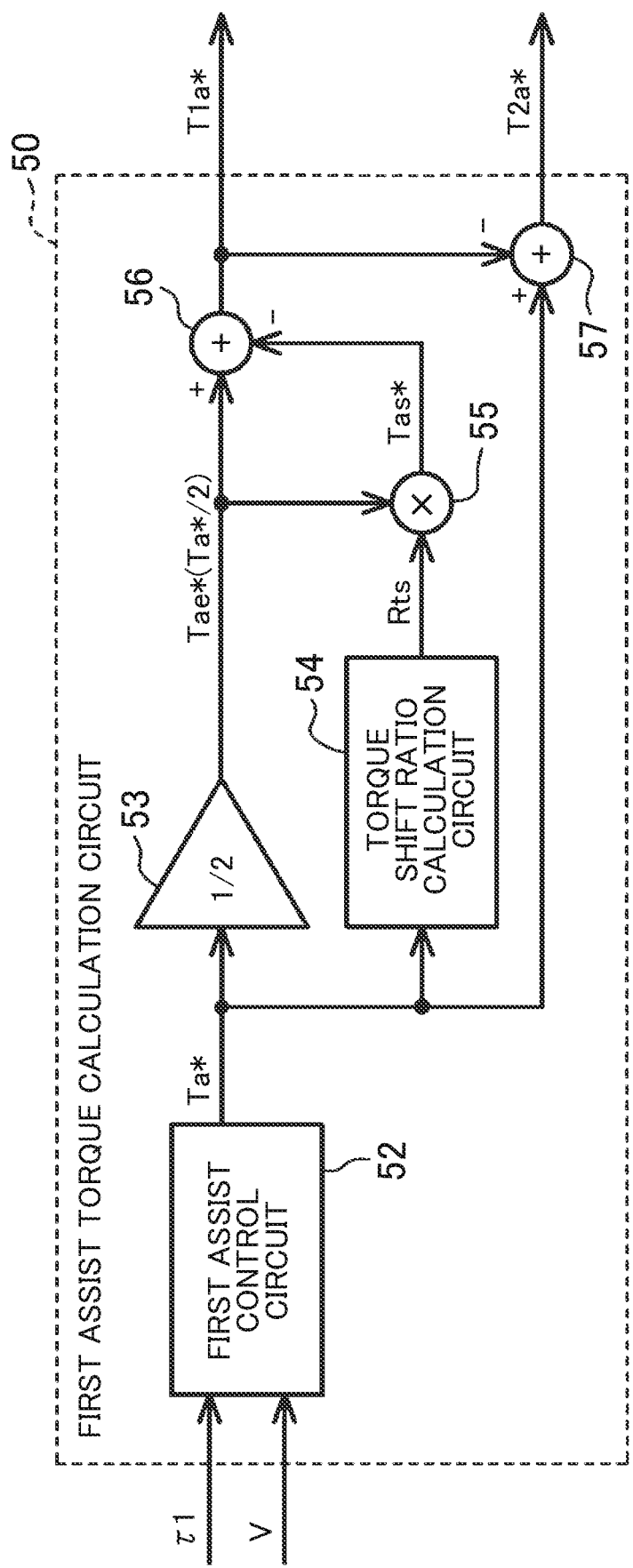
FIG. 4 is a block diagram illustrating the schematic configuration of a first assist torque calculation circuit.

In this embodiment, as illustrated in FIG. 4, the first assist torque calculation circuit 50 includes the first assist control circuit 52, the equal distribution circuit 53, the torque shift ratio calculation circuit 54, the multiplier 55, and the adders 56 and 57, but the present invention is not limited to this case.

Figure 10A:
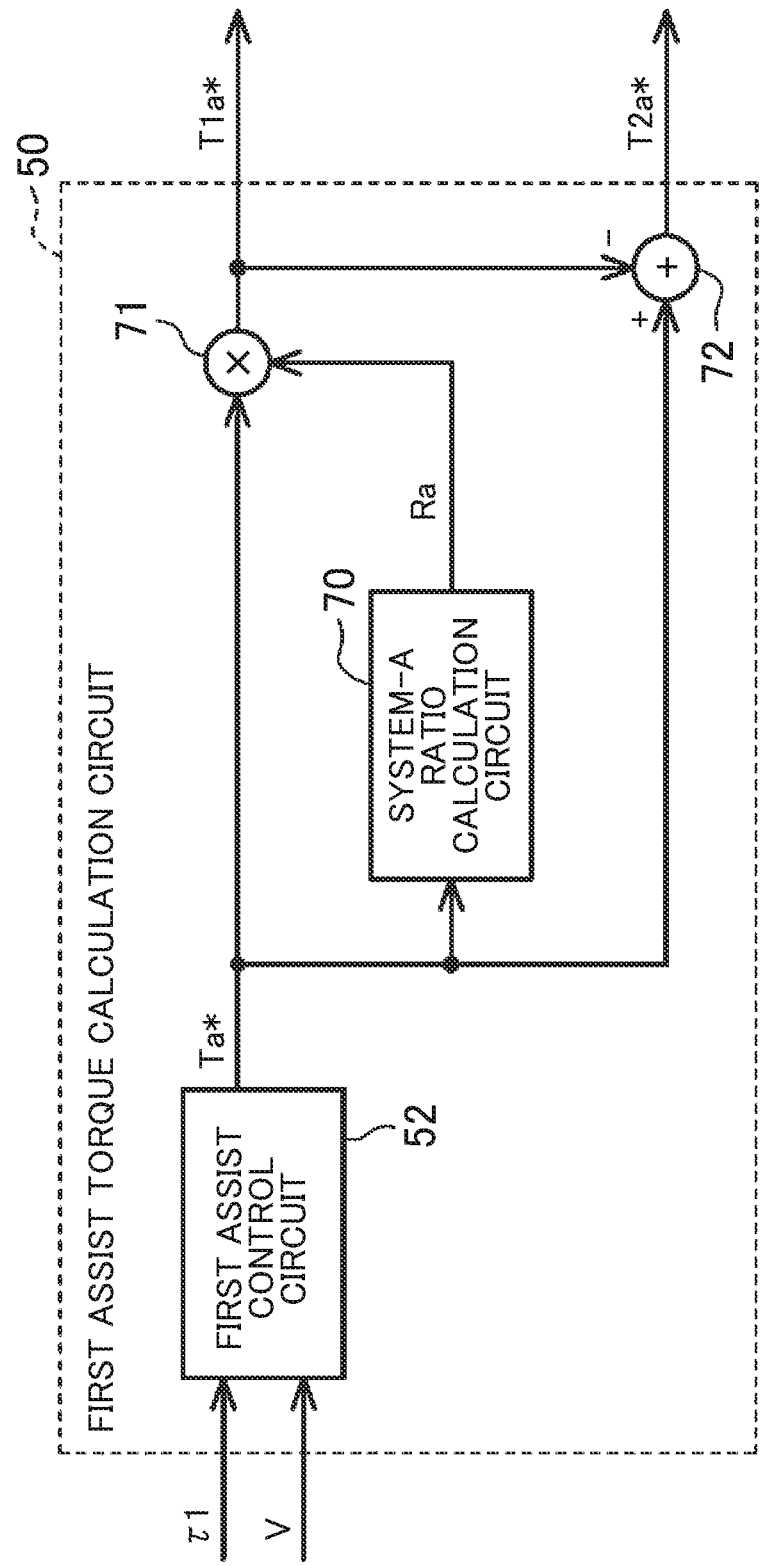

For example, as illustrated in FIG. 10A, the first assist torque calculation circuit 50 may include the first assist control circuit 52, a system-A ratio calculation circuit 70 serving as the distribution ratio setting circuit, a multiplier 71, and an adder 72. In this case, the system-A ratio calculation circuit 70 calculates a system-A ratio Ra that is the ratio of the first command value T1$a$* to the basic command value Ta*. The multiplier 71 calculates the first command value T1$a$* by multiplying the basic command value Ta* calculated by the first assist control circuit 52 by the system-A ratio Ra calculated by the system-A ratio calculation circuit 70. The adder 72 calculates the second command value T2$a$* by subtracting the first command value T1$a$* calculated by the multiplier 71 from the basic command value Ta* calculated by the first assist control circuit 52.

Figure 10B:
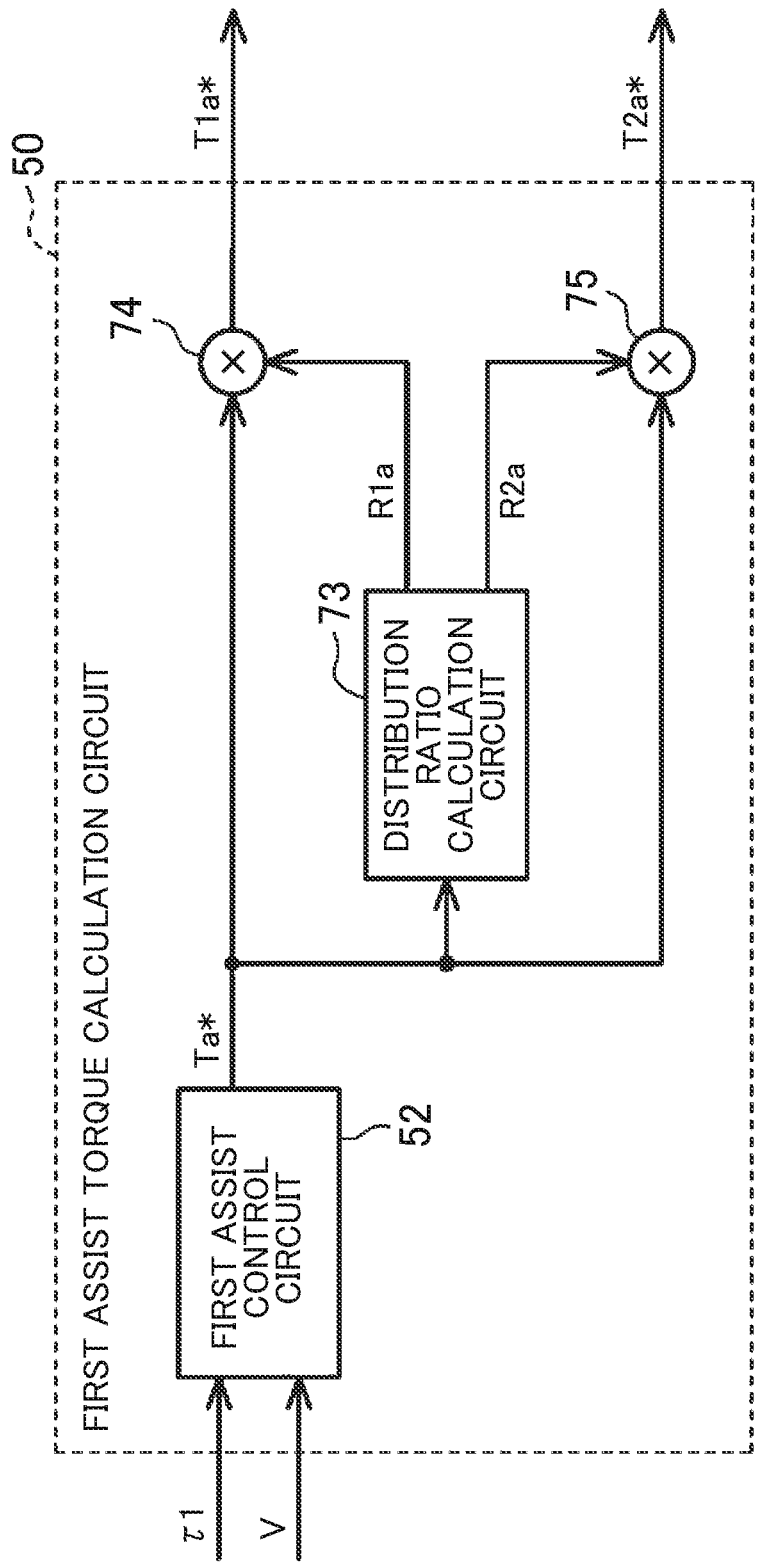

As illustrated in FIG. 10B, the first assist torque calculation circuit 50 may include the first assist control circuit 52, a distribution ratio calculation circuit 73 serving as the distribution ratio setting circuit, a multiplier 74, and a multiplier 75. In this case, the distribution ratio calculation circuit 73 calculates a system-A ratio R1$a$ and a system-B ratio R2$a$. The system-A ratio R1$a$ is the ratio of the first command value T1$a$* to the basic command value Ta*. The system-B ratio R2$a$ is the ratio of the second command value T2$a$* to the basic command value Ta*. The multiplier 74 calculates the first command value T1$a$* by multiplying the basic command value Ta* calculated by the first assist control circuit 52 by the system-A ratio R1$a$ calculated by the distribution ratio calculation circuit 73. The multiplier 75 calculates the second command value T2$a$* by multiplying the basic command value Ta* by the system-B ratio R2$a$ calculated by the distribution ratio calculation circuit 73.

As illustrated in FIG. 10C, the first assist torque calculation circuit 50 may include the first assist control circuit 52 and a distribution ratio variably setting circuit 76 serving as the distribution ratio setting circuit. In this case, the distribution ratio variably setting circuit 76 stores a plurality of distribution ratios (first to third distribution ratios D1 to D3). The distribution ratio variably setting circuit 76 acquires the basic command value Ta* calculated by the first assist control circuit 52 and the vehicle speed V detected by the vehicle speed sensor 42. The distribution ratio variably setting circuit 76 selects a distribution ratio to be used based on the acquired vehicle speed V. The distribution ratio variably setting circuit 76 calculates the first command value T1$a$* by multiplying the basic command value Ta* by the distribution ratio selected based on the vehicle speed V, and calculates the second command value T2$a$* by multiplying the basic command value Ta* by a difference obtained by subtracting the selected distribution ratio from "1".

The first assist control circuit 52 calculates the basic command value Ta* based on the steering torque $\tau 1$ and the vehicle speed V, but may calculate the basic command value Ta* based on the steering torque $\tau 1$ alone. The torque shift ratio calculation circuit 54 calculates the torque shift ratio Rts based on the input basic command value Ta*, but the present invention is not limited to this case. For example, the steering torque $\tau 1$ (steering torque $\tau 2$) may be input to the torque shift ratio calculation circuit 54, and the torque shift ratio calculation circuit 54 may calculate the torque shift ratio Rts based on the input steering torque $\tau 1$.

It is only necessary that the fail-safe processing illustrated in the flowchart of FIG. 9 be executed in at least one of the first microcomputer 32$a$ and the second microcomputer 32$b$. In this embodiment, the fail-safe processing illustrated in the flowchart of FIG. 9 is executed during the unbalanced control, but need not be executed.

In this embodiment, the control load on the system B is set lighter than the control load on the system A, but the control load on the system A may be set lighter than the control load on the system B. In this embodiment, when a transition is made from the range in which the absolute values of the steering torques $\tau 1$ and $\tau 2$ are equal to or smaller than the steering torque threshold $\tau 0$ to the range in which the absolute values of the steering torques $\tau 1$ and $\tau 2$ are larger than the steering torque threshold $\tau 0$, the first command values T1$a$* and T1$b$* make a continuous transition from the state in which the first command values T1$a$* and T1$b$* are larger than the equalized command value Tae* to the state in which the first command values T1$a$* and T1$b$* are equal to the equalized command value Tae*. The present invention is not limited to this case. That is, when the steering torques $\tau 1$ and $\tau 2$ are equal to or smaller than the steering torque threshold $\tau 0$, the slope of the curve of the first command values T1$a$* and T1$b$* relative to the steering torques $\tau 1$ and $\tau 2$ may be set flatter in the case where the steering torques $\tau 1$ and $\tau 2$ are close to zero than the case where the steering torques $\tau 1$ and $\tau 2$ are close to the steering torque threshold $\tau 0$. The slope of the curve of the second command values T2$a$* and T2$b$* relative to the steering torques $\tau 1$ and $\tau 2$ may similarly be set steeper in the case where the steering torques $\tau 1$ and $\tau 2$ are close to zero than the case where the steering torques $\tau 1$ and $\tau 2$ are close to the steering torque threshold $\tau 0$.

In this embodiment, the control loads on the system A and the system B are set equal to each other during the parallel control, but the present invention is not limited to this case. That is, it is only necessary that the difference between the control loads on the system A and the system B be set smaller during the parallel control than the unbalanced control. In other words, it is only necessary that the difference between the first command value T1$a$* and the first command value T1$b$* be set smaller and the difference between the second command value T2$a$* and the second command value T2$b$* be set smaller during the parallel control than the unbalanced control.

In this embodiment, the steering system is implemented by the EPS 1 configured to apply an assist force to the steering shaft 11 by the motor 20. The present invention is not limited to this case. For example, the steering system may be implemented by an EPS 1 configured to apply an assist force to the rack shaft 12 by a motor 20 having a rotation shaft 21 arranged in parallel to the rack shaft 12. The steering system may be a steer-by-wire system. That is, any steering system may be employed as long as the steering system applies power to the steering mechanism 2 by the motor 20.

What is claimed is:

1. A steering control apparatus configured to control a steering system configured to apply, by a motor, a driving force for reciprocating a steering operation shaft, the steering control apparatus comprising:
a control circuit configured to cause the motor to apply a torque to a steering mechanism by calculating a command value of the applied torque based on a steering state variable including a steering torque and controlling power supply to a plurality of coils of the motor in a plurality of systems based on the command value, the plurality of coils in the plurality of systems include a first-system coil and a second-system coil, the control circuit includes:
a first-system control circuit configured to control power supply to the first-system coil based on a first command value of a torque generated by the first-system coil; and
a second-system control circuit configured to control power supply to the second-system coil based on a second command value of a torque generated by the second-system coil, wherein:
the control circuit is configured to execute first control configured to set the first command value and the second command value to be different from each other when an input value, which has a correlation with a total sum of the torque generated by the first-system coil and the torque generated by the second-system coil, is equal to or less than a predetermined value, and
the control circuit is configured to execute second control configured to reduce a difference between the first command value and the second command value when the input value is larger than the predetermined value, as compared to a difference between the first command value and the second command value when the input value is equal to or less than the predetermined value.

2. The steering control apparatus according to claim 1, wherein:
each of the first-system control circuit and the second-system control circuit includes a distribution ratio setting circuit configured to variably set, based on the input value, a distribution ratio that is a ratio between the first command value and the second command value, and each of the first-system control circuit and the second-system control circuit is configured to:
calculate a basic command value of the total sum of the torque generated by the first-system coil and the torque generated by the second-system coil; and
calculate the first command value and the second command value based on the basic command value and the distribution ratio.

3. The steering control apparatus according to claim 2, wherein the distribution ratio setting circuit is configured to:
set the distribution ratio to a value larger than ½ when the first control is executed; and
reduce a difference between the distribution ratio and ½ when the second control is executed as compared to a difference between the distribution ratio and ½ when the first control is executed.

4. The steering control apparatus according to claim 2, wherein the distribution ratio setting circuit is configured to set the distribution ratio so that the first command value is larger than an equalized command value obtained by equally distributing the basic command value, and the second command value is smaller than the equalized command value when the first control is executed.

5. The steering control apparatus according to claim 4, wherein the distribution ratio setting circuit is configured to set the distribution ratio so that the first command value and the second command value are closer to the equalized command value as the input value is closer to the predetermined value when the first control is executed.

6. The steering control apparatus according to claim 3, wherein at least one of the first-system control circuit and the second-system control circuit is configured to, when the first control is executed:
determine whether a sum of the first command value and the second command value is equal to the basic command value and whether the first command value and the second command value have a same sign; and
stop the first control when the sum of the first command value and the second command value is not equal to the basic command value or when the first command value and the second command value do not have the same sign.

7. The steering control apparatus according to claim 1, wherein, in the second control, the first command value and the second command value are set equal to each other.

* * * * *